Patented Aug. 1, 1944

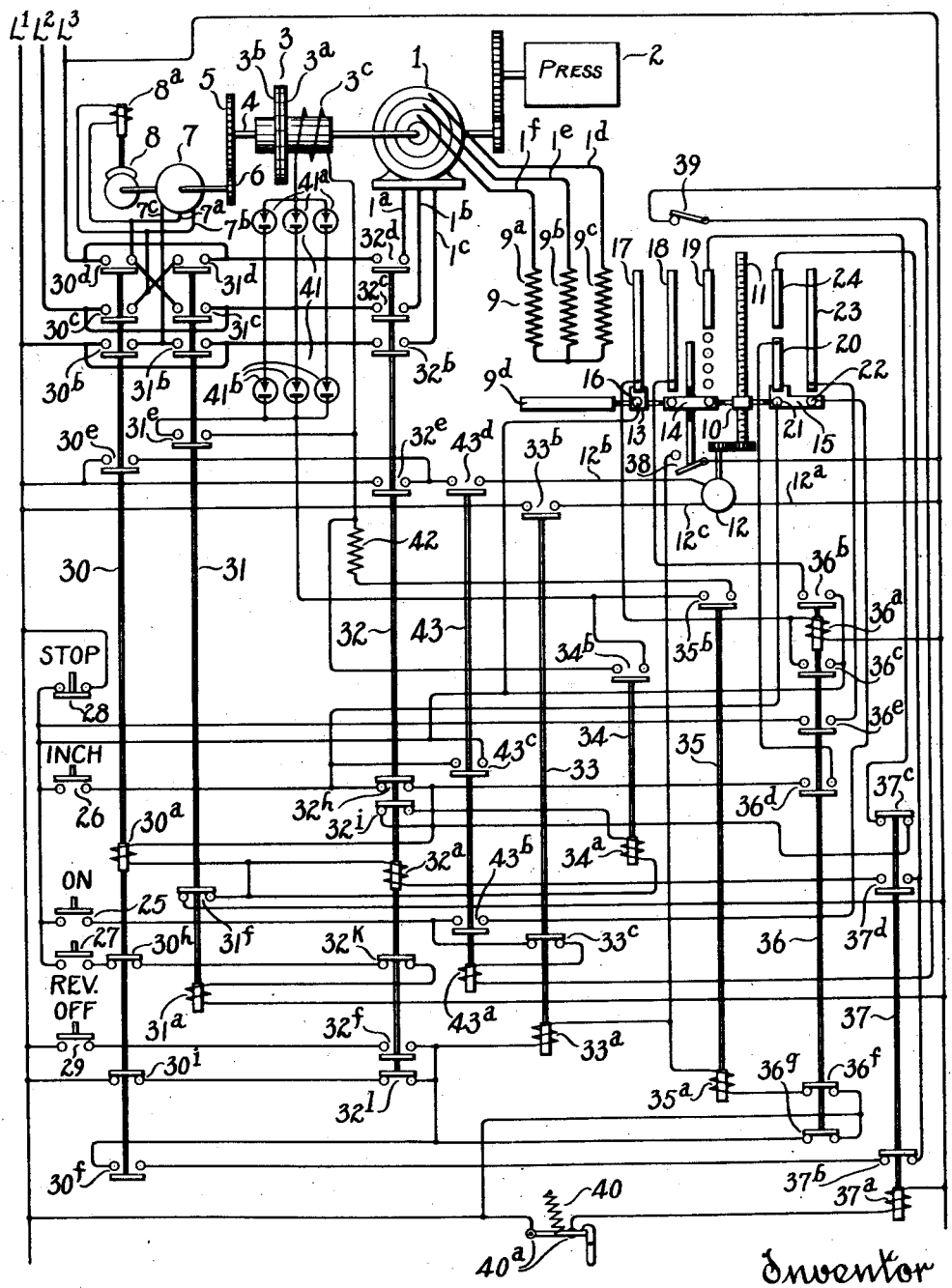

2,354,950

UNITED STATES PATENT OFFICE 2,354,950

PRINTING PRESS DRIVE

Cyril P. Feldhausen, Wauwatosa, Wis., assignor to Cutler-Hammer, Inc., Milwaukee, Wis., a corporation of Delaware Application February 6, 1943, Serial No. 474,986

17 Claims. (Cl. 172—179)

The invention relates to a printing press drive which is particularly suitable for sheet fed printing presses, which must be operated at a speed which may be varied within a wide range and which have to be frequently started, stopped and reversed.

An object of the invention is to provide, in a two motor drive for a printing press which affords forward and reverse inching of the press by a small motor, continuous forward operation at low speed and relatively high and adjustable speed operation by a large motor, quick stoppage by dynamic braking when running at high speed.

Another object is to provide a system of the aforementioned type which when operating at high speed automatically slows down to a creeping speed in the event of improper feeding of a sheet or sheets of paper.

Another object is to provide a system which includes means operable automatically under given conditions for effecting substantially instantaneous change from a high speed to a low speed and return to high speed upon manual operation of an associated part.

Another object is to provide a two motor printing press drive which affords quick stoppage from any speed.

Another object is to enable instantaneous change in drive from the high speed motor regardless of its speed to the low speed motor for a period determinable by the operator, and to provide for return of the drive to the high speed motor automatically at the termination of such period.

The system comprises a relatively large motor positively coupled to the press. The motor may also be coupled to a counter-shaft by an electromagnetic clutch having two cooperating parts mounted on the motor shaft and on the counter-shaft, respectively. A small motor provided with a brake is positively coupled to the counter-shaft.

A controller provides for starting of the press and operation thereof at low speed by means of the small motor upon energization of the clutch. To increase the speed the large motor is energized to take up the load, whereupon the clutch is de-energized and the small motor is automatically disconnected. If it is desired to stop the press while the large motor is operating the latter is de-energized, the clutch is energized and the brake applied for quick stoppage of the press. If it is desired to change from a high speed drive by the large motor to a low speed drive by the small motor, the large motor is de-energized and the small motor and clutch are energized, the brake being simultaneously released, whereupon the small motor is driven by the press above synchronous speed to act as a dynamic brake for rapid deceleration of the press to the slow speed provided by the small motor drive. The press may also be reversed by energizing the small motor for reverse rotation. All functions are controlled in a conventional manner from suitable push button stations.

The accompanying diagram illustrates a printing press control system constructed in accordance with my invention.

The system is supplied with energy from the lines $L^1$, $L^2$ and $L^3$ of a three-phase power circuit. A slip-ring induction motor 1, having primary terminals $1^a$, $1^b$ and $1^c$ and secondary terminals $1^d$, $1^e$ and $1^f$, is geared in any suitable manner to a press 2. The shaft of the motor 1 has keyed thereon one element $3^a$ of an electromagnetic clutch 3, which is provided with a co-operating second element $3^b$ and an electromagnetic or energizing winding $3^c$. The element $3^b$ is keyed upon a counter-shaft 4, provided with a gear 5, which engages a pinion 6 keyed upon the shaft of a small squirrel-cage motor 7, having terminals $7^a$, $7^b$ and $7^c$. Connected across the terminals $7^a$ and $7^b$ is the energizing winding $8^a$ of a magnetic brake 8, the drum of which is keyed to the shaft of the motor 7.

To control the speed of motor 1 a resistor 9 is provided having three star-connected sections $9^a$, $9^b$ and $9^c$, which may be simultaneously varied by means of a bridging contactor $9^d$. The bridging contactor $9^d$ is insulatedly connected to a cross-head 10 to move therewith. Said cross-head is provided with a thread which engages a threaded shaft 11, to be moved rectilinearly by said shaft in one direction or the other upon rotation of the latter in opposite directions respectively. The shaft 11 may be rotated by a pilot motor 12, the latter having a common terminal $12^a$ and forward and reverse terminals $12^b$ and $12^c$, respectively.

The cross-head 10 is also provided with insulated bridging contactors 13, 14 and 15. These sliding bridging contactors cooperate with stationary contacts as follows: In its lowermost position the contactor 13 engages a contact button 16 and also an elongated contact segment 17, which is aligned with said button 16 and said contactor 13, so that upon leaving the button 16 in its upward travel the bridging contactor 13 rests entirely upon the segment 17. The bridging contactor 14 is arranged to bridge two segments 18 and 19, respectively, after it has traveled for some distance in an upward direction. In its lowermost position it rests upon two dead buttons as indicated in the diagram. The length of the segments 17, 18 and 19 is determined by the operating cycle of the controller as will be explained hereinafter. The bridging contactor 15 in its lowermost position is adapted to bridge contact buttons 21 and 22 and also an elongated segment 20, arranged in the line of travel of the bridging contactor 15 and in alinement with the button 21. As the bridging contactor 15 moves upwardly from its lowermost position it leaves the contact buttons 21 and 22, and engages an elongated contact segment 23, so as to complete a circuit between the segments 20 and 23. Upon further upward travel the bridging contactor 15 leaves the segment 20, and engages a contact segment 24 alined with the former, to complete a circuit between the contact segments 23 and 24.

To initiate the various different operations or functions the system includes a normally open "running" or "on" push button switch 25 for starting and increasing the speed, a normally open "inching" push button switch 26, a normally open "reverse" push button switch 27, a normally closed "stop" push button switch 28, and a normally open "off" push button switch 29 for changing the speed of the equipment from a higher to a lower speed. The primary circuit of the motor 7 is connectable to the line for forward rotation by an electromagnetic switch 30, having an energizing winding 30ª, normally open main contacts 30ᵇ, 30ᶜ and 30ᵈ, normally open auxiliary contacts 30ᵉ and 30ᶠ, and normally closed auxiliary contacts 30ʰ and 30ⁱ. For connecting the motor 7 to the line for reverse rotation the system includes a reverse electromagnetic switch 31, having an energizing winding 31ª, normally open main contacts 31ᵇ, 31ᶜ and 31ᵈ, normally open auxiliary contacts 31ᵉ, and normally closed auxiliary contacts 31ᶠ.

The primary winding of the large motor 1 is connectable to the power supply by an electromagnetic switch 32, having an energizing winding 32ª, normally open main contacts 32ᵇ, 32ᶜ and 32ᵈ, normally open auxiliary contacts 32ᵉ and 32ᶠ, and normally closed auxiliary contacts 32ʰ, 32ⁱ, 32ᵏ and 32ˡ.

The system further includes an electromagnetic relay 33, having an energizing winding 33ª, normally open contacts 33ᵇ, and normally closed contacts 33ᶜ; a relay 34, having an energizing winding 34ª and normally open contacts 34ᵇ; a relay 35, having an energizing winding 35ª and normally open contacts 35ᵇ; a relay 36, having an energizing winding 36ª, normally open contacts 36ᵇ, 36ᶜ, 36ᵈ and 36ᵉ and normally closed contacts 36ᶠ and 36ᵍ; a relay 37, having an energizing winding 37ª, normally closed contacts 37ᵇ and 37ᶜ and normally open contacts 37ᵈ; and a relay 43, having an energizing winding 43ª and normally open contacts 43ᵇ, 43ᶜ and 43ᵈ. To control the current in the clutch winding 3ᶜ, under certain conditions which will be described hereinafter, a resistor 42 is provided.

There is further provided a normally closed limit switch 38 which is opened by the cross-head 10 when it reaches its lowermost position, and a normally closed limit switch 39 which is opened by said cross-head when it reaches the upper limit of its travel. Associated with the press is a switch 40, which is provided with contacts 40ª biased to open position and which are moved to and held in closed position under normal operating conditions. Contacts 40ª are adapted to be tripped to open position in the event of improper feeding of a sheet or sheets of paper. Switch 40 when tripped transfers the press drive from the large to the small motor for operation at low speed. Upon manual resetting of switch 40 to closed position the press will be driven either by the large motor or the small motor, depending upon the position of the cross-head 10.

The energizing winding 3ᶜ of the electromagnetic clutch 3 may be supplied with rectified direct current by a rectifier 41 having three star-connected rectifying elements 41ª, whose like terminals are connected to the lines $L^1$, $L^2$ and $L^3$, respectively, while the other like terminals are connected together and to one terminal of the energizing winding 3ᶜ. Rectifier 41 includes another group of three rectifier elements 41ᵇ, which are also star-connected and have one of their like terminals respectively connected to the lines $L^1$, $L^2$ and $L^3$, said terminals however being of opposite polarity to those of the group 41ª, connected to the same line terminals. The second terminals of the group 41ᵇ are jointly connected to one terminal of the auxiliary contact 31ᵉ of switch 31.

The connection of the system and the operation thereof will now be described. In the position shown in the diagram a circuit is established from line $L^1$, through the stop push button 28, contact button 16, bridging contactor 13 of cross-head 10, segment 17, through the energizing coil 36ª to line $L^3$. The relay 36 is thus energized and closes its normally open contacts and opens its normally closed contacts. The relay 37 is also energized by a circuit from line $L^1$, through contacts 40ª; coil 37ª to line $L^3$, with consequent closure of contacts 37ᵈ and opening of contacts 37ᵇ and 37ᶜ.

If it is now desired to inch the equipment the inch button 26 is depressed. This establishes a circuit from line $L^1$ through push button switches 28 and 26, contacts 32ʰ, energizing coil 30ª, and contacts 31ᶠ to line $L^3$. Thus the switch 30 is energized and closes its main contacts 30ᵇ, 30ᶜ and 30ᵈ, to connect the small motor 7 to the power supply for forward direction of rotation. At the same time the brake magnet winding 8ª is energized to release the small motor armature. Another circuit extends from contacts 32ʰ, through contacts 32ⁱ, energizing coil 34ª and contacts 31ᶠ to line $L^3$. This energizes relay 34 and closes contacts 34ᵇ, thus energizing clutch coil 3ᶜ through a circuit from the lines $L^1$, $L^2$ and $L^3$ through rectifiers 41ᵇ, contacts 34ᵇ, coil 3ᶜ and rectifiers 41ª, to the lines $L^1$, $L^2$ and $L^3$. This couples the small motor to the large motor shaft, and the press is rotated forwardly at inching speed as long as the inch button 26 is depressed. Release of the button 26 will stop the equipment.

If it is desired to inch the press in the reverse direction with the controller in the position shown, the push button switch 27 is depressed thereby completing a circuit from line $L^1$ through push button switches 28 and 27, contacts 30ʰ, 32ᵏ and energizing coil 31ª to line $L^3$. The switch 31 thus closes its normally open contacts 31ᵇ, 31ᶜ and 31ᵈ, thereby connecting the motor 7 to the power lines for rotation thereof in the reverse direction. At the same time the brake magnet coil 8ª is energized, as will be obvious. Energization of the switch 31 also closes the normally open contacts 31ᵉ, which are connected in parallel with the aforementioned contacts 34ᵇ, so that the clutch coil 3ᶜ is also energized to connect the motor 7 to the press and rotate it in said reverse direction.

If it is desired to run the press continuously at the lowest speed on the "on" push button switch 25 is depressed and then immediately released. This completes a circuit from line L¹ through contacts 28 and 25, 33ᶜ, energizing coil 43ᵃ, limit switch 39 to line L³. The relay 43 closes and thus parallels the switch 25 by a circuit extending from one pole (line L¹) of the switch 25 through contacts 43ᶜ, contact button 21, bridging contactor 15, contact button 22, contacts 43ᵇ, to the other side of switch 25. Thus upon release of switch 25 the relay 43ᵃ remains energized. A circuit is also established from line L¹ through contacts 28, 43ᶜ, 32ʰ, energizing coil 30ᵃ, and contacts 31ᶠ to line L³. This again energizes the switch 30 to connect the small motor 7 to the power line for forward direction of rotation and energizes the brake magnet winding 8ᵃ, through switch contacts 30ᶜ and 30ᵈ. At the same time the relay coil 34ᵃ is energized through the contact 43ᶜ of relay 43 (then closed) and the normally closed contacts 32ʰ and 32ⁱ of switch 32, which connects said relay coil 34ᵃ in parallel with the energizing coil 30ᵃ. The contacts 34ᵇ close and again energize the clutch winding 3ᶜ, through a circuit which has been traced heretofore.

Energization of the winding 43ᵃ closes the contacts 43ᵈ, and connects the pilot motor 12 for forward direction of rotation by a circuit from line L¹ through contacts 30ᵉ and 43ᵈ to terminal 12ᵇ, through the motor 12 and terminal 12ᵃ to line L³. The motor 12 thus rotates to move the cross-head 10 in an upward direction. Upon such movement of the cross-head the bridging contactor 13 breaks the connection between the contact button 16 and contact segment 17, but the relay 36 remains energized through its contacts 36ᶜ which shunt the connection theretofore established by the bridging contactor 13. Under normal operating conditions the contacts 40ᵃ of the switch 40 are closed, as aforedescribed, thus establishing a circuit from Line L¹ through contacts 40ᵃ and the energizing coil 37ᵃ of relay 37 to line L³. The relay 37 thus is energized and the contacts 37ᵇ and 37ᶜ are opened, and contacts 37ᵈ are closed. As soon as the bridging contactor 15 leaves its lowermost position it breaks the circuit between contacts 21 and 22 (thus interrupting the energizing circuit of relay coil 43ᵃ to discontinue upward driving of crosshead 10 by motor 12), and completes a circuit between segments 20 and 23. A circuit is thus established from line L¹, through contacts 28, 36ᵉ, segment 23, over contactor 15 to segment 20, contact 36ᵈ, energizing coil 30ᵃ, and through contacts 31ᶠ to line L³, so that the relay 30 remains energized.

However, if the push button 25 has been held closed the motor 12 continues to rotate until the bridging contactor 14 ultimately makes contact between the segments 18 and 19. This presets a circuit for coil 30ᵃ of switch 30, for completion upon reclosure of contacts 37ᶜ of relay 37. Upon further movement of the cross-head 10 the bridging contactor 15 connects the segments 23 and 24. This completes a circuit from L¹ through the push button contacts 28 and contacts 36ᵉ, segments 23 and 24, contacts 37ᵈ, energizing coil 32ᵃ and contacts 31ᶠ to line L³. Upon energization of coil 32ᵃ of switch 32 the primary winding of the motor 1 is connected to the power supply lines, and the contacts 32ʰ and 32ⁱ are opened, thereby de-energizing the switch 30 and the relay 34, to disconnect the small motor 7 from the line and set the brake 8. At the same time bridging contactor 9ᵈ acts to gradually decrease the value of resistors 9ᵃ, 9ᵇ and 9ᶜ included in circuit with the secondary winding of motor 1. De-energization of the relay 34 opens contacts 34ᵇ, which de-energizes the clutch winding 3ᶜ, so that the small motor comes to a stop.

Continued upward movement of the cross-head 10 causes gradual reduction of the value of resistor 9 in circuit to thereby increase the speed of the motor 1. At the upper limit of its travel the cross-head 10 opens the limit switch 39 thereby de-energizing the circuit of the relay coil 43ᵃ which opens the contacts 43ᵈ and brings the pilot motor 12 to a stop.

In the event of improper feeding of a sheet or sheets of paper to the press the contacts 40ᵃ of switch 40 are opened to de-energize the coil 37ᵃ, which causes closure of contacts 37ᵇ and 37ᶜ and opening of contacts 37ᵈ. Closure of contacts 37ᶜ completes a circuit from line L¹ through closed contacts 36ᵇ, segment 18, contactor 14, segment 19, contacts 37ᶜ, through coil 30ᵃ, contacts 31ᶠ to line L³ and switch 30 connects the small motor 7 to the line in the manner aforedescribed. Closure of contacts 37ᵇ of relay 37 and 30ᶠ of switch 30 completes a circuit from line L¹ through closed contacts 36ᵉ, segment 23 through contactor 15 to segment 24, and through contacts 37ᵇ and 30ᶠ, through coil 33ᵃ and limit switch 38 to line L³. The relay 33 is thus energized to complete a circuit from line L¹ through contacts 33ᵇ, to terminal 12ᶜ of the motor 12, through the motor to terminal 12ᵃ and line L³, and the motor 12 causes the cross-head 10 to move downward to the small motor running position. The energization of the switch 30 also energizes the clutch winding 3c in the manner aforedescribed and the small motor 7 is driven above its synchronous speed to act as a dynamic brake on the press to slow it down. Opening of contacts 37ᵈ de-energizes coil 32ᵃ and the switch 32 in opening de-energizes the large motor 1. Upon manual resetting of switch 40 the contacts 40ᵃ are closed and the relay 37 is again energized. If under these conditions the bridging contactor 15 still makes contact with segment 24, the large motor 1 will again be energized and the small motor de-energized and the press accelerated to a relatively high speed (as determined by the position of cross-head 10).

If it is desired to slow down the press while the large motor 1 is energized the push button 29 is depresesd thereby establishing a circuit from line L¹ through contacts 29, 32ᶠ, coil 33ᵃ, contacts 38 to line L³. The energization of relay 33 completes a circuit from line L¹ to contacts 33ᵇ, terminal 12ᶜ of the motor 12, through the motor to terminal 12ᵃ and line L³, and the cross-head 10 is moved in a downward direction thereby increasing the amount of the resistors 9 in the secondary circuit of the large motor 1 and slowing down the latter.

If power should fail with the small motor 7 running the relay coil 36ᵃ is de-energized. This effects closure of contact 36ᵍ and completes a circuit from line L¹ through contacts 36ᵍ, through the energizing coil 33ᵃ, limit switch 38 to line L³. Upon return of power, relay 33 is thus energized and it connects the pilot motor 12ᵃ for reverse rotation to move the cross-head 10 in a downward direction.

Pushing the stop button 28 causes de-energization of the coil 36ᵃ of relay 36. This effects completion of a circuit from line L¹, through contacts 36ᶠ, energizing coil 35ᵃ, and limit switch 38 to line L³. The coil 35ᵃ of relay 35 is energized thereby energizing the clutch winding 3ᶜ, through contacts 35ᵇ and the resistor 42. The clutch magnet is thus energized at a relatively low value to permit some slippage so as to reduce the shock on the press, but as the brake magnet 8ᵃ of the small motor 7 is de-energized the latter will bring the press ultimately to a standstill.

If, with the cross-head 10 in a relatively high speed position, the stop button switch 28 is depressed, the coil 36ᵃ of relay 36 is de-energized, thereby closing contacts 36ᶠ and causing energization of the relay 35 which connects the magnetizing winding 3ᶜ of the clutch 3 to the rectifiers through the contacts 35ᵇ thereby coupling the small motor 7 to the large motor 1. The coil 33ᵃ of relay 33 is energized through contacts 36ᵉ, thereby causing contacts 33ᵇ to connect the pilot motor 12 across the line for reverse rotation. This causes movement of the cross-head 10 toward its lowermost position.

Depression of the stop button 28 under all conditions causes immedate de-energization of all of the switches, whereupon the inch button 26 may be operated thereby energizing the relay 34 and small motor switch 30, by a circuit extending from line L¹ through contacts 26, 32ʰ, coil 30ᵃ, and contacts 31ᶠ to line L³, for permitting inching of the press while the cross-head 10 is in any intermediate position, but no other manipulations of the system are possible until the cross-head again reaches its lowermost position and relay 36 is energized.

In this connection it should be noted that upon deenergization of relay 36 the coil of relay 33 is energized, the relay contacts 33ᵇ when thus closed completing a circuit for motor 12 to drive cross-head 10 toward its lowermost position.

Also as an incident to depression of stop pushbutton 28 closure of the normally closed contacts 30ⁱ and the normally closed contacts 32ⁱ is insured, thus completing an energizing circuit for the coil 33ᵃ of relay 33, which circuit may be traced from line L¹ through switch 28, contacts 30ⁱ and 32ⁱ, coil 33ᵃ, through limit switch 38 to line L³. Resultant closure of normally open contacts 33ᵇ of relay 33 completes a circuit for motor 12 to effect downward movement of cross-head 10 to the position thereof shown, in which position limit switch 38 is opened to effect deenergization of relay coil 33ᵃ and opening of contacts 33ᵇ thereof to stop motor 12 and thereby discontinue downward movement of said cross-head.

I claim:

1. In a variable speed two-motor drive for printing presses and other machines, in combination, a relatively large driving motor, a smaller driving motor, means affording operative connections between said motors and the driven machine and including a clutch through which operative connection between said smaller motor and the driven machine is made, and control means for said motors and said clutch to afford drive of the machine by said motors selectively and dynamic braking of the machine by said smaller motor, said control means for dynamic braking providing for engagement of said clutch to connect said smaller motor while the machine operates at any speed within the speed range of said large motor and disconnecting said large motor from circuit.

2. In a variable speed two-motor drive for printing presses and other machines, in combination, a relatively large driving motor, a smaller driving motor, means affording operative connections between said motors and the driven machine and including a clutch through which operative connection between said smaller motor and the driven machine is made, and control means for said motors and said clutch to afford drive of the machine by said motors selectively, and dynamic braking of the machine by said smaller motor, said control means for dynamic braking providing for engagement of said clutch to connect said smaller motor while the machine operates at any speed within the speed range of said large motor and disconnecting said large motor from circuit, and said control means upon slowdown of the machine to the speed of the smaller motor providing for continuing operation of the machine pending a manual operation to stop the machine.

3. For printing presses and other machines, in combination, a relatively large driving motor, a smaller driving motor, means affording operative connections between said motors and the driven machine, said means including an electromagnetic clutch through which operative connection between said smaller motor and the driven machine is made, and control means for said motors and said clutch to afford drive of the machine by said motors selectively and dynamic braking of the machine by said smaller motor with said clutch engaged, said control means including automatic emergency means operative while said large motor is driving with said small motor declutched to effect engagement of said clutch for dynamic braking by said smaller motor.

4. For printing presses and other machines, in combination, a relatively large driving motor, a smaller driving motor, means affording operative connections between said motors and the driven machine, said means including an electromagnetic clutch through which operative connection between said smaller motor and the driven machine is made, and control means for said motors and said clutch to afford drive of the machine by said motors selectively and dynamic braking of the machine by said smaller motor with said clutch engaged, said control means including automatic emergency means operative while said large motor is driving with said smaller motor declutched to effect engagement of said clutch for dynamic braking by said smaller motor for slowdown of the machine and continued drive thereof at the smaller motor speed.

5. For printing presses and other machines, in combination, a relatively large driving motor, a smaller driving motor, means affording operative connections between said motors and the driven machine, said means including an electromagnetic clutch through which operative connection between said smaller motor and the driven machine is made, and control means for said motors and said clutch to afford drive of the machine by said motors selectively and dynamic braking of the machine by said smaller motor, said control means comprising a manually set device having automatic tripping means and acting when tripped while said clutch is disengaged to effect engagement thereof for dynamic braking by said smaller motor and for continued drive of the machine at the speed of the smaller motor pending resetting of said device.

6. For printing presses and other machines, in combination, a relatively large driving motor, a smaller driving motor, means affording operative connections between said motors and the driven machine, said means including an electromagnetic clutch through which operative connection between said smaller motor and the driven machine is made, and control means for said motors and said clutch to afford drive of the machine by said motors selectively and dynamic braking of the machine by said smaller motor, said control means including a device having different positions for different speeds of the larger motor and further comprising a device having automatic tripping means and acting when tripped while said clutch is disengaged to effect engagement thereof for dynamic braking by said smaller motor and for continued drive of the machine at the speed of the smaller motor, and said control means upon resetting of the last mentioned device while the first mentioned device calls for speed higher than that of the smaller motor acting to accelerate the machine to such speed.

7. In a variable speed two-motor drive for printing presses and other machines, in combination, a relatively large induction motor, a smaller induction motor, means affording operative connections between said motors and the driven machine and including a clutch through which operative connection between said smaller motor and the driven machine is made, and control means for said motors and said clutch to afford drive of the machine by the motors selectively and dynamic braking by said smaller motor, said control means for dynamic braking affording engagement of said clutch while the machine operates within the range of speed of said large motor and for termination of the supply of power to said large motor.

8. In a variable speed two-motor drive for large printing presses and other machines, in combination, a relatively large induction motor, a smaller induction motor, means affording operative connections between said motors and the driven machine and including a clutch through which operative connection between said smaller motor and the driven machine is made, and control means for said motors and said clutch to afford drive of the machine by the motors selectively and dynamic braking by said smaller motor, said control means for dynamic braking affording engagement of said clutch while the machine operates within the range of speed of said large motor and for termination of the supply of power to said large motor, and said control means comprising an emergency device operable automatically to so effect dynamic braking and pending manual reset insuring against operation of the machine except within the speed range of said smaller motor.

9. For printing presses and other machines, in combination, a relatively large driving motor of the induction type, a smaller driving motor of the induction type, means affording operative connections between said motors and the driven machine and comprising an electromagnetically controlled clutch through which operative connection between said smaller motor and the driven machine is made, and control means for said motors and clutch to afford drive of the machine by said motors selectively and dynamic braking of the machine by said smaller motor, said control means while the machine is operating within the speed range of said large motor providing for engagement of said clutch and termination of the power supply to said large motor for dynamic braking of the machine and affording slowdown without stopping while limiting the machine to slow speed pending a given manual operation.

10. For printing presses and other machines, in combination, a relatively large driving motor for operating the machine in one direction, a smaller driving motor to operate the machine in opposite directions selectively, means affording operative connections between said motors and the driven machine, said means including a controllable clutch through which operative connection between said smaller motor and the driven machine is made, and control means for said motors and said clutch to afford drive of the machine by said motors selectively and drive of the machine by said smaller motor in opposite directions selectively, said control means affording for dynamic braking of the machine by said smaller motor engagement of said clutch while the machine is operating within the range of speed of said large motor and for termination of the supply of power to said large motor.

11. For printing presses and other machines, in combination, a relatively large driving motor for operating the machine in one direction, a smaller driving motor to operate the machine in opposite directions selectively, means affording operative connections between said motors and the driven machine, said means including a controllable clutch through which operative connection between said smaller motor and the driven machine is made, and control means for said motors and said clutch to afford drive of the machine by said motors selectively and drive of the machine by said smaller motor in opposite directions selectively, said control means affording for dynamic braking of the machine by said smaller motor engagement of said clutch while the machine is operating within the range of speed of said large motor and for termination of the supply of power to said large motor, and comprising to so effect dynamic braking an automatic emergency device requiring manual resetting prior to subsequent drive of the machine by said large motor.

12. For printing presses and other machines, in combination, a relatively large driving motor, a smaller driving motor, means affording operative connections between said motors and the driven machine, said means including a controllable clutch through which operative connection between said smaller motor and the driven machine is made, and control means for said motors and said clutch to afford drive of the machine by said motors selectively, said control means affording for dynamic braking of the machine by said smaller motor engagement of said clutch while the machine is operating within the range of speed of said large motor and for termination of the supply of power to said large motor, and comprising to so effect dynamic braking an automatic emergency device requiring manual resetting prior to subsequent drive of the machine by said large motor, said control means following operation of said emergency device providing for continued operation of the machine by said smaller motor pending a manual operation for stopping or for re-acceleration.

13. For printing presses and other machines, in combination, an electric motor drive affording slow speed and a multiplicity of higher speeds and control means for said drive comprising inching means to effect drive at slow speed, and means to effect starting and drive at higher speeds, the means to effect operation at higher speeds having a position from which it is movable to effect speed increase in increments and to which it must be returned prior to effecting re-acceleration after stopping, but said control means meanwhile affording inching at slow speed through the medium of said inching means.

14. For printing presses and other machines, in combination, an electric motor drive affording slow speed and a multiplicity of higher speeds, and control means therefor comprising slow speed inching means and starting and running means including a controller movable from a normal position progressively to other positions for predetermined progressively increasing speeds, and said control means necessitating return of said controller to said normal position prior to re-acceleration after stopping but while said controller is returning to said normal position affording inching at slow speed through the medium of said inching means.

15. For printing presses and other machines, in combination, a drive comprising a large motor and a smaller motor, and control means for said motors affording inching and starting through the medium of said smaller motor and running at any one of a number of progressively increasing speeds through the medium of said large motor, said control means having a normal condition to which it must be restored prior to restarting said large motor after stopping but having inching means operable during return of said control means to said normal condition to effect inching through the medium of said smaller motor.

16. For printing presses and other machines, in combination, a two-motor drive comprising a large motor and a smaller motor, and control means for said motors to effect slow speed inching and starting through the medium of said smaller motor and running at any one of a number of progressively increasing speeds through the medium of said large motor, said control means including a manual inching switch, a manual starting switch and a movable speed regulating device, which device is movable from a normal position to render effective said large motor and to gradually increase the speed thereof, and said control means upon stopping said motors requiring return of said speed regulating device to normal position prior to restarting said large motor or restarting said smaller motor through the medium of said starting switch but during return of said device to said normal position enabling inching operation of said smaller motor through the medium of said inching switch.

17. For printing presses and other machines, in combination, a two-motor drive comprising a large motor and a smaller motor, means affording operative connections between said motors and the driven machine and including a clutch through which operative connection between said smaller motor and the driven machine is made, and control means for said motors and said clutch to afford drive of the machine by said motors selectively and dynamic braking of the machine by said smaller motor with said clutch engaged, said control means comprising means to effect running at any one of a number of printing speeds through the medium of said large motor, and emergency means to effect dynamic braking through the medium of said smaller motor for slowdown without stopping, said means for controlling the speed of said large motor tending automatically to return to a given position following operation of said emergency means or stopping by said control means and requiring full return movement prior to restarting of said large motor after stopping operation of said control means, but said control means meanwhile affording inching operation of said smaller motor through the medium of said inching means and affording restarting of said large motor without full return of said controller following tripping and resetting of said emergency means.

CYRIL P. FELDHAUSEN.